United States Patent
Ju et al.

(10) Patent No.: US 10,113,038 B2
(45) Date of Patent: Oct. 30, 2018

(54) THERMOPLASTIC RESIN COMPOSITION FOR EXTERIOR MATERIAL, AND MOLDED

(71) Applicant: LOTTE ADVANCED MATERIALS CO., LTD., Yeosu-si (KR)

(72) Inventors: Min Ji Ju, Uiwang-si (KR); Yun Jin Choi, Uiwang-si (KR); Soo Kyung Kahng, Uiwang-si (KR); Gi Hong Kim, Uiwang-si (KR); Dong Hee Kim, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 13 days.

(21) Appl. No.: 15/314,637

(22) PCT Filed: Jun. 26, 2015

(86) PCT No.: PCT/KR2015/006535
§ 371 (c)(1),
(2) Date: Nov. 29, 2016

(87) PCT Pub. No.: WO2015/199482
PCT Pub. Date: Dec. 30, 2015

(65) Prior Publication Data
US 2018/0142071 A1  May 24, 2018

(30) Foreign Application Priority Data

Jun. 27, 2014  (KR) .................. 10-2014-0079818

(51) Int. Cl.
*C08K 3/08* (2006.01)
*C08J 5/04* (2006.01)
*C08K 7/02* (2006.01)
*C08K 3/40* (2006.01)

(52) U.S. Cl.
CPC .................. *C08J 5/045* (2013.01); *C08K 3/08* (2013.01); *C08K 3/40* (2013.01); *C08K 7/02* (2013.01); *C08K 2003/0812* (2013.01)

(58) Field of Classification Search
USPC ....................................................... 524/35
See application file for complete search history.

(56) References Cited

U.S. PATENT DOCUMENTS

| 5,269,991 | A | 12/1993 | Gueret |
| 5,723,522 | A | 3/1998 | Bergmann |
| 2002/0028868 | A1 | 3/2002 | Brasser et al. |
| 2014/0354014 | A1 | 12/2014 | Okuda et al. |

FOREIGN PATENT DOCUMENTS

| JP | 06-079745 A | 3/1994 |
| JP | 09-505329 A | 5/1997 |
| JP | 10-219078 A | 8/1998 |
| JP | 2001-200064 A | 7/2001 |
| JP | 2002-507646 A | 3/2002 |
| JP | 2003-128853 A | 5/2003 |
| JP | 2004-122390 | 4/2004 |
| JP | 2005-036114 A | 2/2005 |
| JP | 2005-154530 A | 6/2005 |
| JP | 2005-248089 A | 9/2005 |
| JP | 2009-091484 A | 4/2009 |
| JP | 2011-116838 A | 6/2011 |
| JP | 2011-148939 A | 8/2011 |
| KR | 10-0447717 B | 9/2004 |
| WO | 2013/084976 A1 | 6/2013 |
| WO | 2015/199482 A1 | 12/2015 |

OTHER PUBLICATIONS

International Search Report in counterpart International Application No. PCT/KR2015/006535 dated Oct. 1, 2015, pp. 1-4.
Office Action in counterpart Korean Application No. 10-2014-0079818 dated Nov. 18, 2016, pp. 1-5.
Office Action in counterpart Japanese Application No. 2016-575533 dated Aug. 14, 2018, pp. 1-5.

*Primary Examiner* — Terressa Boykin
(74) *Attorney, Agent, or Firm* — Addition, Higgins & Pendleton, P.A.

(57) ABSTRACT

The present invention relates to a thermoplastic resin composition for an exterior material, and a molded product using the same, the composition containing a thermoplastic resin and at least two types of cellulose-based fibers, wherein 0.1-5 parts by weight of the cellulose-based fibers are contained on the basis of 100 parts by weight of the thermoplastic resin.

13 Claims, 2 Drawing Sheets

[FIG. 1]
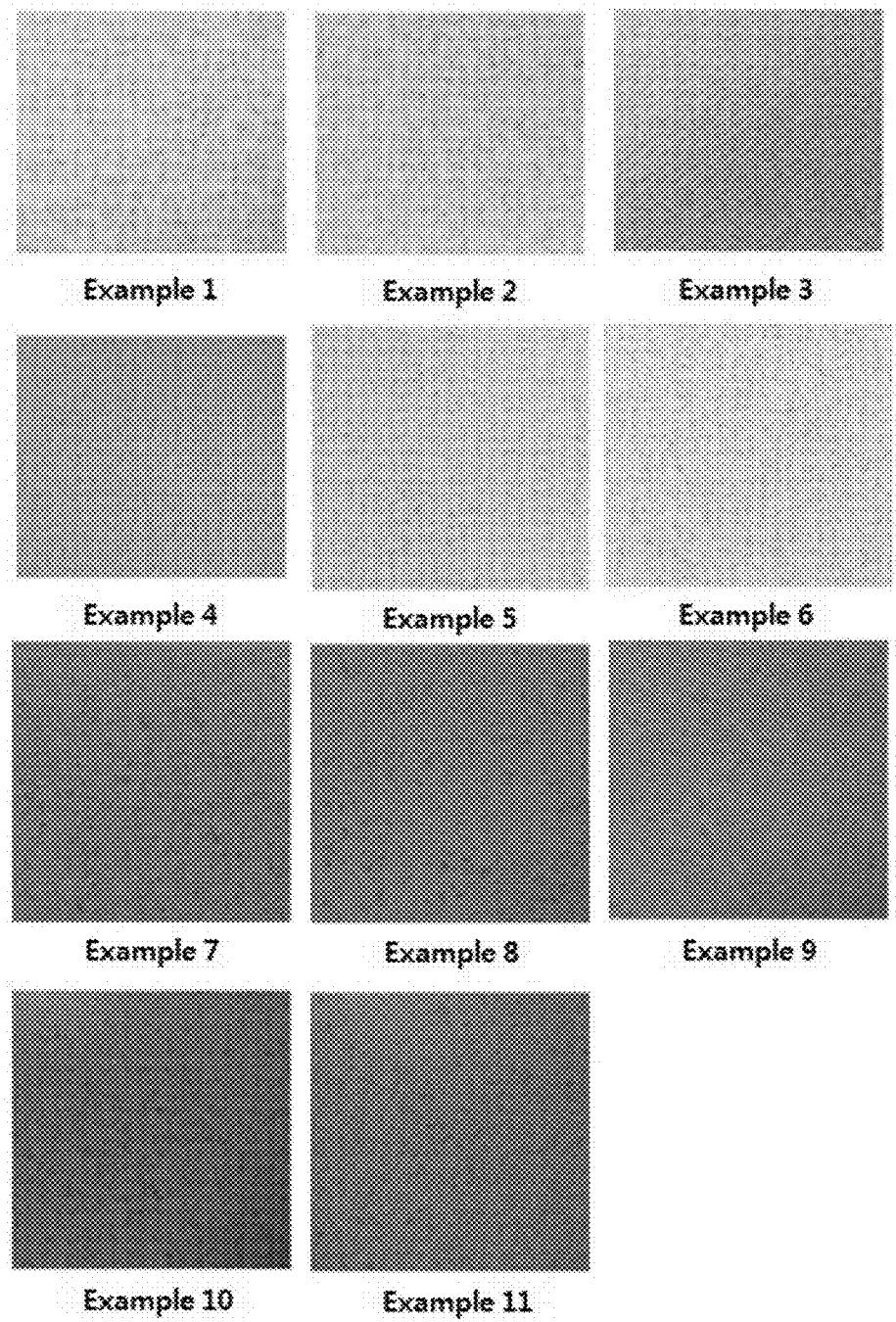

[FIG. 2]
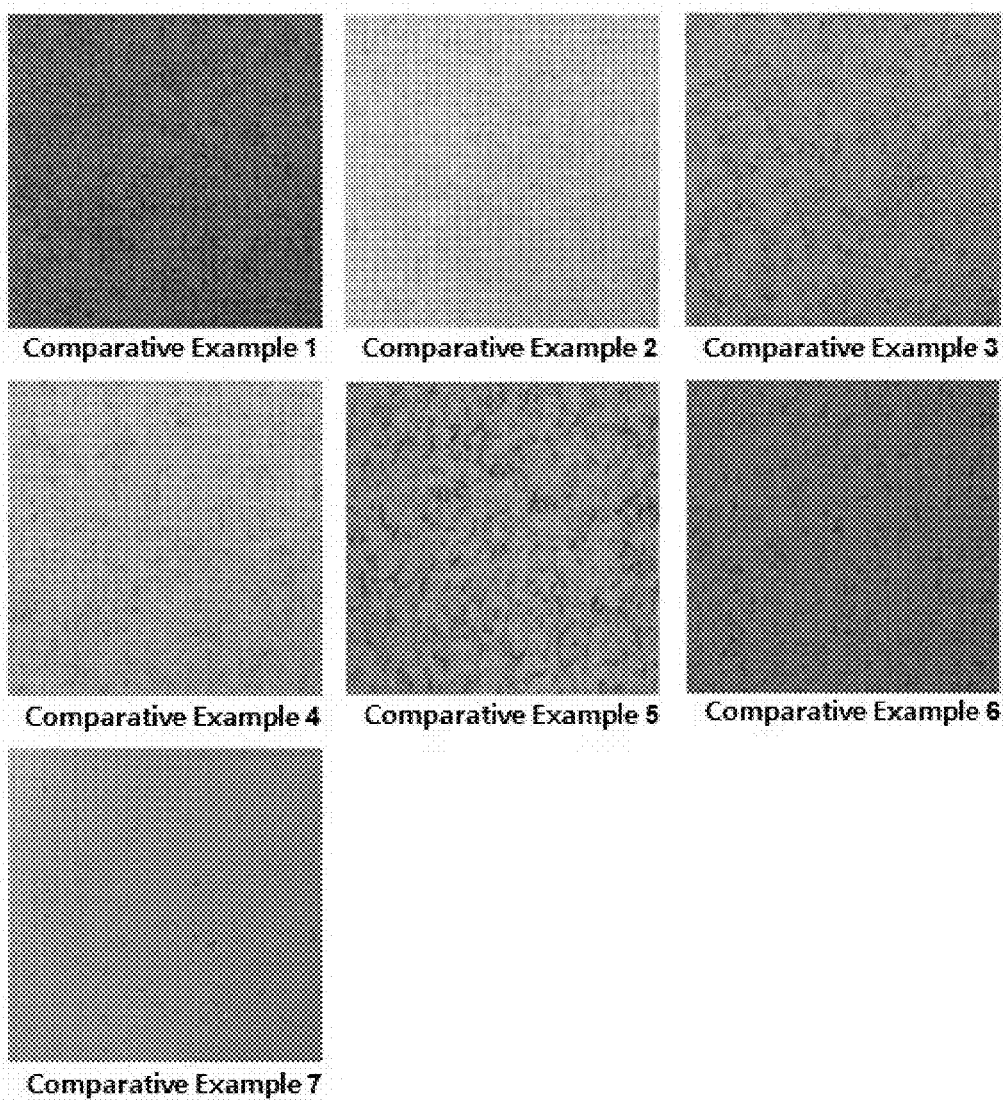

THERMOPLASTIC RESIN COMPOSITION FOR EXTERIOR MATERIAL, AND MOLDED

CROSS-REFERENCE TO RELATED APPLICATIONS

This application claims priority to and the benefit of International Application No. PCT/KR2015/006535, filed Jun. 26, 2015, which published as WO 2015/199482 on Dec. 30, 2015, and Korean Patent Application No. 10-2014-0079818, filed in the Korean Intellectual Property Office on Jun. 27, 2014, the entire disclosure of each of which is incorporated herein by reference.

TECHNICAL FIELD

The present invention relates to a thermoplastic resin composition for an exterior material and a molded article manufactured using the same, and, more particularly, to a thermoplastic resin composition for an exterior material which includes at least two cellulose fibers and an additive in an optimal ratio, thereby providing a natural and beautiful appearance like a real natural stone or a fabric without need for a separate process such as attaching a film to a surface of a molded article, and a molded article manufactured using the same.

BACKGROUND ART

Synthetic resins have the advantage of realizing various colors and are widely used as an exterior material for furniture and home appliances. However, typical synthetic resins have a limitation in realizing a natural and complicated pattern like a real natural stone or fabric. Thus, there have been various attempts aimed at realization of new patterns using particulate additives. However, there was a problem in that such patterns are too simple and artificial and have low marketability.

In order to overcome such a problem to realize a natural pattern like a real natural stone or fabric, there have been proposed (1) a method in which a molded article is manufactured using a synthetic resin, followed by painting of a surface of the article, (2) a method in which stone dust or wood flour is spayed on an upper surface of a melt extruded resin sheet, followed by embedding the sprayed particles into the surface of the sheet using a pressing force of a cooling roll, as disclosed in Korean Patent No. 10-0447717, and (3) a method in which a natural texture is provided to a sheet using wood flour, followed by laminating the sheet on a base sheet, as disclosed in Japanese Patent Publication No. 2004-122390.

However, synthetic resin products obtained by these methods do not have a natural texture due to a simple appearance, require an additional process such as painting or attachment of a printed film, or have poor heat resistance and thus are not suitable as an exterior material for home appliances, which are manufactured by injection molding.

Therefore, there is a need for a synthetic resin which can be produced into an article by injection molding while realizing a natural appearance like a real natural stone or fabric.

DISCLOSURE

Technical Problem

It is one aspect of the present invention to provide a thermoplastic resin composition for an exterior material which includes at least two cellulose fibers having different physical properties in an optimal ratio, thereby providing a natural and beautiful appearance like a real natural stone or a fabric without need for a separate process.

It is another aspect of the present invention to provide a thermoplastic resin composition for an exterior material which includes cellulose fibers and an additive such as aluminum flakes, each having optimal properties, in an optimal ratio, thereby better realizing a stone texture.

Technical Solution

In accordance with one aspect of the present invention, there is provided a thermoplastic resin composition for an exterior material, including: a thermoplastic resin and at least two cellulose fibers, wherein the cellulose fibers are present in an amount of 0.1 parts by weight to 5 parts by weight relative to 100 parts by weight of the thermoplastic resin.

The cellulose fibers may include first cellulose fibers having an average diameter of less than 30 μm and second cellulose fibers having an average diameter of 30 μm or greater, wherein the first cellulose fibers may have an average diameter of 5 μm to 20 μm, and the second cellulose fibers may have an average diameter of 40 μm to 400 μm.

The thermoplastic resin composition may further include at least one additive selected from mica, aluminum flakes, and glass flakes, and an amount ratio between the cellulose fibers may range from 1:0.1 to 1:6.

The cellulose fibers may have an average length of 400 μm to 4000 μm.

The cellulose fibers may have a heat resistance of 230° C. or higher and an average particle aspect ratio of 1.0 or less, and the thermoplastic resin may have a processing temperature of 300° C. or less.

The thermoplastic resin may include a polycarbonate resin, a rubber-modified vinyl copolymer resin, or a polycarbonate/rubber-modified vinyl copolymer alloy resin, and the additive may be present in an amount of 0.05 parts by weight to 5 parts by weight relative to 100 parts by weight of the thermoplastic resin.

The aluminum flakes may be present in an amount of 0.5 parts by weight to 3 parts by weight relative to 100 parts by weight of the thermoplastic resin; the glass flakes may be present in an amount of 0.05 parts by weight to 0.5 parts by weight relative to 100 parts by weight of the thermoplastic resin; and an amount ratio of the cellulose fibers to the additive may range from 1:0.1 to 1:0.5.

In accordance with another aspect of the present invention, there is provided a molded article manufactured using the thermoplastic resin composition as set forth above, wherein the molded article may have a textile or natural stone pattern on a surface thereof.

Advantageous Effects

According to the present invention, it is possible to provide a thermoplastic resin composition for an exterior material which includes at least two cellulose fibers having different physical properties in an optimal ratio, thereby providing a natural and beautiful appearance like a real natural stone or a fabric without need for a separate process.

In addition, it is possible to provide a thermoplastic resin composition for an exterior material which includes a thermoplastic resin and cellulose fibers having optimized heat resistance and thus dose not melt or decompose under process conditions such as extrusion or injection molding while preventing thermal discoloration.

Further, it is possible to provide a thermoplastic resin composition for an exterior material which includes cellulose fibers and an additive such as aluminum flakes, each having optimal properties, in an optimal ratio, thereby better realizing a stone texture.

DESCRIPTION OF DRAWINGS

FIG. 1 shows images of molded articles manufactured using thermoplastic resin compositions for an exterior material prepared in Examples according to the present invention.

FIG. 2 shows images of molded articles manufactured using thermoplastic resin compositions prepared in Comparative Examples.

BEST MODE

The above and other aspects, features, and advantages of the present invention will become apparent from the detailed description of the following embodiments in conjunction with the accompanying drawings. It should be understood that the present invention is not limited to the following embodiments and may be embodied in different ways, and that the embodiments are provided for complete disclosure and thorough understanding of the present invention by those skilled in the art. The scope of the present invention is defined only by the claims.

Unless otherwise defined herein, all terms including technical or scientific terms used herein have the same meanings as commonly understood by those skilled in the art to which the present invention pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

The present invention relates to a thermoplastic resin composition for an exterior material and a molded article manufactured using the same, and, more particularly, to a thermoplastic resin optimized as an exterior material for furniture and home appliances.

(A) Thermoplastic Resin

A thermoplastic resin composition for an exterior material according to the present invention includes a thermoplastic resin and at least two cellulose fibers.

The thermoplastic resin preferably has a processing temperature of 300° C. or less, more preferably 250° C. or less, most preferably 100° C. to 230° C. If the processing temperature is higher than 300° C., it is impossible to sufficiently provide effects of the present invention since the cellulose fiber included therewith partially melts or decomposes during injection molding.

The thermoplastic resin may be any suitable resin so long as the resin has a processing temperature within the above range.

For example, the thermoplastic resin may include a polycarbonate resin, a rubber-modified vinyl copolymer resin, or a polycarbonate/rubber-modified vinyl copolymer alloy resin.

The polycarbonate resin may be prepared by reacting phosgene, halogen formate, carbonic diester, or a combination thereof with diphenols.

Examples of the diphenols may include hydroquinone, resorcinol, 4,4'-dihydroxyphenyl, 2,2-bis-(4-hydroxyphenyl)-propane (also referred to as "bisphenol A"), 2,4-bis-(4-hydroxyphenyl)-2-methylbutane, bis-(4-hydroxyphenyl)-methane, 1,1-bis-(4-hydroxyphenyl)-cyclohexane, 2,2-bis-(3-chloro-4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, bis(4-hydroxyphenyl)-sulfoxide, bis(4-hydroxyphenyl)-ketone, bis(4-hydroxyphenyl)-ether, and the like. Preferably, the diphenols may be 2,2-bis-(4-hydroxyphenyl)-propane, 2,2-bis-(3,5-dichloro-4-hydroxyphenyl)-propane, or 1,1-bis-(4-hydroxyphenyl)-cyclohexane. More preferably, the diphenols may be 2,2-bis-(4-hydroxyphenyl)-propane.

The polycarbonate resin may have a weight average molecular weight of 10,000 g/mol to 200,000 g/mol, specifically 15,000 g/mol to 80,000 g/mol, without being limited thereto.

The polycarbonate resin may be a mixture of copolymers prepared from at least two diphenols. In addition, the polycarbonate resin may include a linear polycarbonate resin, a branched polycarbonate resin, a polyester carbonate copolymer resin, and the like.

Examples of the linear polycarbonate resin may include a bisphenol A polycarbonate resin. Examples of the branched polycarbonate resin may include a resin prepared by reacting a polyfunctional aromatic compound such as trimellitic anhydride and trimellitic acid with diphenols and carbonates. The polyfunctional aromatic compound may be present in an amount of 0.05 mol % to 2 mol % based on the total number of moles of the branched polycarbonate resin. The polyester carbonate copolymer resin may include a resin prepared by reacting a bifunctional carboxylic acid with diphenols and carbonates. Here, the carbonates may include a diaryl carbonate such as diphenyl carbonate, ethylene carbonate, and the like.

The rubber-modified vinyl copolymer resin includes 5 wt % to 95 wt % of a vinyl polymer and 5 wt % to 95 wt % of a rubbery polymer.

Examples of the rubbery polymer may include butadiene rubbers, acrylic rubbers, ethylene/propylene rubbers, styrene/butadiene rubbers, acrylonitrile/butadiene rubbers, isoprene rubbers, ethylene/propylene/diene terpolymer (EPDM) rubbers, polyorganosiloxane/polyalkyl (meth)acrylate rubber composites, and a combination thereof.

The vinyl polymer may be a polymer composed of: 50 wt % to 95 wt % of a first vinyl monomer including an aromatic vinyl monomer, an acrylic monomer, a heterocyclic monomer or a combination thereof; and 5 wt % to 50 wt % of a second vinyl monomer including an unsaturated nitrile monomer, an acrylic monomer, a heterocyclic monomer, or a combination thereof.

The aromatic vinyl monomer may include styrene, $C_1$ to $C_{10}$ alkyl-substituted styrene, halogen-substituted styrene, or a combination thereof. Examples of the alkyl-substituted styrene may include o-ethylstyrene, m-ethylstyrene, p-ethylstyrene, α-methylstyrene, and the like.

The acrylic monomer may include (meth)acrylic acid alkyl esters, (meth)acrylic acid esters, or a combination thereof. Here, the term "alkyl" refers to a $C_1$ to $C_{10}$ alkyl. Examples of the (meth)acrylic acid alkyl esters may include methyl (meth)acrylate, ethyl (meth)acrylate, propyl (meth)acrylate, butyl (meth)acrylate, and the like. Preferably, the (meth)acrylic acid alkyl esters may be methyl (meth)acrylate. Examples of the (meth)acrylic acid esters may include (meth)acrylate and the like.

The heterocyclic monomer may include maleic anhydride, N-substituted alkyl or phenyl maleimide, or a combination thereof.

The unsaturated nitrile monomer may include acrylonitrile, methacrylonitrile, ethacrylonitrile, or a combination thereof.

In preparation of the rubber-modified vinyl copolymer resin, the rubbery polymer may have a particle diameter of 1 μm to 10 μm so as to improve impact resistance of the resin and surface properties of a molded article manufactured using the resin. In addition, when the rubbery polymer has a particle diameter of 1 μm to 10 μm, it is possible to secure excellent impact strength.

The rubber-modified vinyl copolymer resin may be used alone or as a mixture thereof.

One example of the rubber-modified vinyl copolymer resin may be a resin including a copolymer obtained by grafting styrene, acrylonitrile, and optionally methyl (meth)acrylate to a butadiene rubber, an acrylic rubber, or a styrene/butadiene rubber.

Another example of the rubber-modified vinyl copolymer resin may be a resin including a copolymer obtained by grafting methyl (meth)acrylate to a butadiene rubber, an acrylic rubber, or a styrene/butadiene rubber.

The rubber-modified vinyl copolymer resin may be prepared by any typical polymerization method known in the art, such as emulsion polymerization, suspension polymerization, solution polymerization, and mass polymerization.

(B) Cellulose Fiber

The thermoplastic resin composition for an exterior material according to the present invention includes the thermoplastic resin composition and at least two cellulose fibers.

The cellulose fibers may include at least two cellulose fibers, preferably two to five cellulose fibers. If the resin composition includes only one cellulose fiber, it is impossible to realize a natural stone or textile pattern, which is the main purpose of the present invention.

An amount ratio between at least two cellulose fibers may range from 1:0.1 to 1:6. Preferably, the amount ratio ranges from 1:0.2 to 1:4.5, more preferably 1:0.5 to 1:2. If the amount ratio is less than 1:0.1 or exceeds 1:6, improvement in appearance due to combination of two or more cellulose fibers cannot be achieved. Here, the amount ratio refers to an amount ratio between two cellulose fibers selected from among a variety of cellulose fibers, and, when the amount ratio falls in the above range, it is possible to maximize improvement in appearance due to combination of a variety of cellulose fibers.

The cellulose fibers may have an average length of 400 μm to 4000 μm. Preferably, the cellulose fibers may have an average length of 500 μm to 4000 μm. If the average length is less than 400 μm, improvement in appearance due to combination of two or more cellulose fibers is insignificant since the fibers are likely to be invisible on a surface of the resin, whereas, if the average length exceeds 4000 μm, the size of the fibers appearing on the surface is excessively large, causing poor naturalness.

Here, the average length of the fibers refers to a value obtained by averaging the longest distance between one end of each cellulose fiber and the other end.

The cellulose fibers may include first cellulose fibers having an average diameter of less than 30 μm and second cellulose fibers having an average diameter of 30 μm or greater. Preferably, the cellulose fibers may include first cellulose fibers having an average diameter of 0.01 μm to 29.9 μm and second cellulose fibers having an average diameter of 30 μm to 800 μm, more preferably, first cellulose fibers having an average diameter of 5 μm to 20 μm and second cellulose fibers having an average diameter of 40 μm to 400 μm. As such, the cellulose fibers including at least two cellulose fibers having different sizes can effectively realize a pattern like real natural stone or fabric.

Here, the average diameter of the fibers refers to a value obtained by averaging the longest chord of a cross-section of each fiber passing through the center of the cross-section.

The cellulose fibers may have a heat resistance of 230° C. or higher. Preferably, the cellulose fibers may have a heat resistance of 250° C. or higher, more preferably 250° C. to 800° C. If the cellulose fibers have a heat resistance of less than 230° C., the resin composition can be thermally decomposed or discolored during extrusion or injection molding, whereas, if the cellulose fibers have a heat resistance of higher than 800° C., other properties can deteriorate causing poor appearance or the cellulose fibers need to be subjected to separate treatment, which would otherwise be unnecessary.

The cellulose fibers may have an average aspect ratio of 1.0 or less. Preferably, the cellulose fibers may have an average aspect ratio of 0.05 to 0.8, more preferably, 0.11 to 0.22. If the average aspect ratio exceeds 1.0, there is a limitation in realization of a natural appearance due to the shape of particles. Here, the average aspect ratio of the fibers refers to a value obtained by averaging a ratio of diameter of the longest axis of a cross-section of each fiber to diameter of the shortest axis.

The cellulose fibers may be present in an amount of 0.1 parts by weight to 5 parts by weight relative to 100 parts by weight of the thermoplastic resin. Preferably, the cellulose fibers may be present in an amount of 1.0 part by weight to 4.9 parts by weight, more preferably 1.0 part by weight to 1.9 parts by weight relative to 100 parts by weight of the thermoplastic resin. If the amount of the cellulose fibers is less than 0.1 parts by weight, it is impossible to provide a natural stone texture, if the amount of the cellulose fibers exceeds 5 parts by weight, durability of the resin considerably deteriorates while making extrusion and injection molding difficult.

(C) Additive

Preferably, the resin composition further includes at least one additive selected from among mica, aluminum flakes, and glass flakes, in addition to the thermoplastic resin and at least two cellulose fibers. The additive serves to further enhance natural stone texture.

Among various additives, mica, aluminum flakes, and glass flakes are suitable for mixing with the cellulose fibers of the present invention.

The additive may be present in an amount of 0.05 parts by weight to 5 parts by weight relative to 100 parts by weight of the thermoplastic resin composition. Preferably, the additive may be present in an amount of 0.1 parts by weight to 2 parts by weight, more preferably 0.5 parts by weight to 1 part by weight, relative to 100 parts by weight of the thermoplastic resin composition. If the amount of the additive is less than 0.05 parts by weight, it is difficult to further enhance stone-like texture, whereas, if the amount of the additive exceeds 5 parts by weight, there is a concern of deterioration in processability, and a natural appearance cannot be realized due to an excess of additive particles.

Preferably, the aluminum flakes are present in an amount of 0.1 parts by weight to 3 parts by weight relative to 100 parts by weight of the thermoplastic resin composition, and the glass flakes are present in an amount of 0.05 parts by weight to 0.5 parts by weight relative to 100 parts by weight of the thermoplastic resin composition. When the amounts of the aluminum flakes and the glass flakes fall in the above range, stone-like texture can be best realized in view of particle characteristics of the aluminum flakes and the glass flakes.

An amount ratio of the cellulose fibers to the additive may range from 1:0.01 to 1:0.5. Preferably, the amount ratio may range from 1:0.05 to 1:0.2. If the amount ratio is less than 1:0.01, it is difficult to further enhance stone-like texture, whereas, if the amount ratio exceeds 1:0.5, it is difficult to provide a natural appearance.

In accordance with another aspect of the present invention, there is provided a molded article manufactured using the thermoplastic resin composition for an exterior material as set forth above. It is desirable that the molded article be formed on a surface thereof with a fabric or natural stone pattern. By forming such an additional pattern on the surface of the molded article, it is possible to further improve appearance characteristics.

MODE FOR INVENTION

Next, results of a test for demonstrating the superiority of the thermoplastic resin composition for an exterior material according to the present invention and the molded article manufactured using the same will be described.

TABLE 1

(unit: parts by weight)

| Item | Example | | | | | | | | | | |
|---|---|---|---|---|---|---|---|---|---|---|---|
|  | 1 | 2 | 3 | 4 | 5 | 6 | 7 | 8 | 9 | 10 | 11 |
| A | 100 | 100 | 100 | 100 | 100 | 100 | 100 | 100 | 100 | 100 | 100 |
| B-1 | — | — | — | — | — | — | — | — | — | — | — |
| B-2 | — | — | 0.7 | 0.7 | — | — | — | — | — | — | — |
| B-3 | 1.0 | — | — | — | — | — | — | — | — | — | — |
| B-4 | — | — | 0.7 | 0.7 | — | — | — | — | — | — | — |
| B-5 | — | — | — | — | — | — | — | — | — | — | — |
| B-6 | — | — | 0.5 | 0.5 | — | — | — | — | — | — | — |
| B-7 | — | — | 1.0 | 1.0 | 0.65 | — | — | — | 0.3 | — | — |
| B-8 | — | — | — | — | 0.25 | 0.8 | 0.5 | 0.7 | 0.3 | 0.5 | 1.0 |
| B-9 | — | 1.0 | — | — | — | — | — | — | 1.0 | — | — |
| B-10 | — | — | — | — | — | — | — | — | — | — | — |
| B-11 | — | — | — | — | — | — | — | — | — | — | — |
| B-12 | 1.5 | 1.0 | 2.0 | 2.0 | 0.15 | — | — | — | — | — | — |
| B-13 | — | — | — | — | — | 0.2 | 0.5 | 0.3 | — | 0.5 | 0.5 |
| B-14 | — | — | — | — | — | 0.9 | — | — | — | — | — |
| C | — | — | — | — | — | — | 0.2 | — | — | — | — |
| D | — | 0.5 | — | — | — | — | — | 0.05 | — | — | — |
| Injection mold | General | General | Patterned | General | General | General | General | General | General | General | General |

TABLE 2

(unit: parts by weight)

| Item | Comparative Example | | | | | | |
|---|---|---|---|---|---|---|---|
|  | 1 | 2 | 3 | 4 | 5 | 6 | 7 |
| A | 100 | 100 | 100 | 100 | 100 | 100 | 100 |
| B-1 | — | — | — | 1.0 | — | — | — |
| B-2 | — | — | — | — | — | — | — |
| B-3 | — | — | — | — | — | — | — |
| B-4 | — | — | — | — | — | — | — |
| B-5 | — | — | 1.0 | — | — | — | — |

TABLE 2-continued (unit: parts by weight)

| Item | Comparative Example | | | | | | |
|------|---|---|---|---|---|---|---|
| | 1 | 2 | 3 | 4 | 5 | 6 | 7 |
| B-6 | — | — | — | — | — | — | — |
| B-7 | — | 1.0 | — | — | — | — | — |
| B-8 | — | — | — | — | — | — | 0.025 |
| B-9 | — | — | — | — | — | — | — |
| B-10 | — | — | — | — | 0.5 | — | — |
| B-11 | — | — | — | — | — | 0.5 | — |
| B-12 | 1.0 | — | — | — | — | — | — |
| B-13 | — | — | — | — | — | — | 0.025 |
| B-14 | — | — | — | — | — | — | — |
| C | — | — | — | — | — | — | — |
| D | — | — | — | — | — | — | — |
| Injection mold | General | General | General | General | General | General | General |

Details of components listed in Tables 1 and 2 are as follows:

(A) ABS resin: An ABS resin produced by CHEIL INDUSTRIES Co., Ltd.

(B) Cellulose fiber: B-1 to B-14 are as listed in Table 3.

(C) Aluminum flake: Aluminum flakes produced by Nihonboshitsu Co., Ltd.

(D) Glass flake: Glass flakes produced by Shepherd Color Company.

TABLE 3

| Item | Manufacturer | Length | Diameter (μm) (D50) | Aspect ratio | Thermal Stability (° C.) |
|------|---|---|---|---|---|
| B-1 | Towa Chemical | 538.45 | 15.60 | 0.1751 | 315 |
| B-2 | Towa Chemical | 535.09 | 13.83 | 0.17 | 319 |
| B-3 | Towa Chemical | 509.18 | 16.32 | 0.1729 | 310 |
| B-4 | Towa Chemical | 548.00 | 13.78 | 0.18 | 311 |
| B-5 | Towa Chemical | 556.00 | 14.25 | 0.1784 | 315 |
| B-6 | Towa Chemical | 511.21 | 8.64 | 0.11 | 319 |
| B-7 | Towa Chemical | 536.14 | 8.94 | 0.11 | 319 |
| B-8 | Towa Chemical | 521.51 | 8.61 | 0.11 | 319 |
| B-9 | IFC | 607.70 | 19.03 | 0.22 | 324 |
| B-10 | Towa Chemical | 530.00 | 42.01 | 0.1455 | 313 |
| B-11 | Towa Chemical | 756.61 | 15.45 | 0.64 | 315 |
| B-12 | DAIYA KOGYO | 564.46 | 46.25 | 0.15 | 254 |
| B-13 | DAIYA KOGYO | 3910.80 | 92.61 | 0.2151 | 308 |
| B-14 | DAIYA KOGYO | 3944.66 | 91.83 | 0.2116 | 302 |
| C | Nihon Boshitsu | 1341.95 | 306.62 | 0.72 | 415 |
| D | Shepherd | 549.34 | 115.90 | 0.5675 | 590 |

In Table 3, cellulose fibers, aluminum flakes, and glass flakes used in this test are listed. Here, the size (length, diameter, and aspect ratio (D50)) of the cellulose fibers and flake particles were measured using a QICPIC image analyzer (SYNPATEC). For measurement of heat resistance (thermal stability), a temperature at which at which 10% weight reduction occurred was measured using a Q5000 TGA (TA Instruments) at a heating rate of 20° C./min under a nitrogen stream.

The components listed in Tables 1 and 2 were mixed in a typical mixer, thereby preparing a thermoplastic resin composition for an exterior material. The thermoplastic resin composition was subjected to extrusion using a twin-screw extruder (L/=35, ϕ=45 mm), thereby preparing pellets. The prepared pellets were dried using a jet-type dryer at 80° C. for 5 hours or more, followed by injection molding using a 10 oz. injection machine at an injection temperature of 230° C., thereby preparing a specimen for evaluation of appearance. In all Examples and Comparative Examples excluding Example 3, a general mold without any pattern on a surface thereof was used, and, in Example 3, a mold having a textile pattern on a surface thereof was used.

Images of the specimens prepared in Examples and Comparative Examples are shown in FIGS. 1 and 2.

As shown in FIGS. 1 and 2, it can be seen that the specimens of Comparative Examples 1 to 6, in which one cellulose fiber was used and to which neither the aluminum flakes nor the glass flakes were added, had a simple pattern and were not beautiful in appearance, and the specimen of Comparative Example 7, in which the amount of the cellulose fibers was less than 0.1 parts by weight relative to 100 parts by weight of the thermoplastic resin composition, could not sufficiently exhibit the intended effects of the present invention.

Thus, it can be seen that, the specimen of Comparative Example 7, in which the amount of the cellulose fibers was too low, could not sufficiently show the effects due to combination of two or more cellulose fibers despite using the two or more fiber particles, since the cellulose fibers did not appear on the surface.

Conversely, it can be seen that the specimens of Examples 2, 7, and 8 using flake particles as an additive exhibited more natural stone-like texture, and the specimen of Example 3 using a mold having a textile pattern on a surface thereof could further improve the effects of the present invention.

Therefore, critical significance of the amount ratio between the components and particle characteristics according to the present invention and the superiority of the present invention were demonstrated in this test.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention. Therefore, the scope of the present invention should be defined by the appended claims and equivalents thereof.

INDUSTRIAL APPLICABILITY

According to the present invention, it is possible to provide a thermoplastic resin composition for an exterior material, which includes at least two cellulose fibers and an additive in an optimal ratio, thereby providing a natural and beautiful appearance like a real natural stone or fabric without a need for a separate process such as attaching a film to a surface of a molded article, and a molded article manufactured using the same.

The invention claimed is:

1. A thermoplastic resin composition for an exterior material, comprising:
   a thermoplastic resin and at least two cellulose fibers,
   wherein the cellulose fibers are present in an amount of 0.1 parts by weight to 5 parts by weight relative to 100 parts by weight of the thermoplastic resin, and
   wherein the cellulose fibers comprise first cellulose fibers having an average diameter of 5 µm to 20 µm and second cellulose fibers having an average diameter of 40 µm to 400 µm.

2. The thermoplastic resin composition according to claim 1, further comprising: at least one additive selected from mica, aluminum flakes, and glass flakes.

3. The thermoplastic resin composition according to claim 1, comprising the first cellulose fibers and the second cellulose fibers in a weight ratio of 1:0.1 to 1:6.

4. The thermoplastic resin composition according to claim 1, wherein the cellulose fibers have an average length of 400 µm to 4000 µm.

5. The thermoplastic resin composition according to claim 1, wherein the cellulose fibers have a heat resistance of 230° C. or higher.

6. The thermoplastic resin composition according to claim 1, wherein the cellulose fibers have an average particle aspect ratio of 1.0 or less.

7. The thermoplastic resin composition according to claim 1, wherein the thermoplastic resin has a processing temperature of 300° C. or less.

8. The thermoplastic resin composition according to claim 1, wherein the thermoplastic resin comprises a polycarbonate resin, a rubber-modified vinyl copolymer resin, or a polycarbonate/rubber-modified vinyl copolymer alloy resin.

9. The thermoplastic resin composition according to claim 2, comprising the additive in an amount of 0.05 parts by weight to 5 parts by weight relative to 100 parts by weight of the thermoplastic resin.

10. The thermoplastic resin composition according to claim 2, wherein the composition comprises aluminum flakes in an amount of 0.5 parts by weight to 3 parts by weight relative to 100 parts by weight of the thermoplastic resin, and glass flakes in an amount of 0.05 parts by weight to 0.5 parts by weight relative to 100 parts by weight of the thermoplastic resin.

11. The thermoplastic resin composition according to claim 2, comprising the cellulose fibers and the additive in a weight ratio of 1:0.1 to 1:0.5.

12. A molded article manufactured using the thermoplastic resin composition according to claim 1.

13. The molded article according to claim 12, wherein the molded article has a textile or natural stone pattern on a surface thereof.

* * * * *

UNITED STATES PATENT AND TRADEMARK OFFICE
CERTIFICATE OF CORRECTION

PATENT NO. : 10,113,038 B2
APPLICATION NO. : 15/314637
DATED : October 30, 2018
INVENTOR(S) : Min Ji Ju et al.

It is certified that error appears in the above-identified patent and that said Letters Patent is hereby corrected as shown below:

On the Title Page

Replace the title with:
THERMOPLASTIC RESIN COMPOSITION FOR EXTERIOR MATERIAL, AND MOLDED PRODUCT USING SAME

Signed and Sealed this
Fourth Day of June, 2019

Andrei Iancu
*Director of the United States Patent and Trademark Office*